United States Patent [19]

Cooper

[11] 3,960,985

[45] June 1, 1976

[54] POLYPHEYLENE ETHER-RESIN COMPOSITIONS WITH ORGANOPOLYILOXANES HAVING SILICON-H-BONDS

[75] Inventor: Glenn D. Cooper, Delmar, N.Y.

[73] Assignee: General Electric Company, Pittsfield, Mass.

[22] Filed: Feb. 8, 1974

[21] Appl. No.: 440,759

[52] U.S. Cl............................ 260/874; 260/45.7 R; 260/47 ET; 260/827; 260/824 R; 260/876 R
[51] Int. Cl.².................. C08L 71/04; C08L 25/06; C08L 83/06
[58] Field of Search............... 260/827, 874, 45.7 R, 260/824 R, 47 ET

[56] References Cited
UNITED STATES PATENTS

| | | | |
|---|---|---|---|
| 3,063,872 | 11/1962 | Boldebuck | 260/827 |
| 3,402,143 | 9/1968 | Hay | 260/824 R |
| 3,433,760 | 3/1969 | Clark et al. | 260/827 |
| 3,737,479 | 6/1973 | Haaf | 260/827 |

FOREIGN PATENTS OR APPLICATIONS

| | | | |
|---|---|---|---|
| 1,118,327 | 7/1968 | United Kingdom | 260/827 |

*Primary Examiner*—Wilbert J. Briggs, Sr.
*Attorney, Agent, or Firm*—William F. Mufatti; Edward A. Hedman; James V. Costigan

[57] ABSTRACT

Thermoplastic compositions which comprise a polyphenylene ether resin, an alkenyl aromatic resin and a organopolysiloxane having Si—H bonds are disclosed. These compositions have good thermal stability in that they resist discoloration when processed in a thermal cycle.

16 Claims, No Drawings

POLYPHEYLENE ETHER-RESIN COMPOSITIONS WITH ORGANOPOLYILOXANES HAVING SILICON-H-BONDS

Thermally stable compositions of a polyphenylene ether resin and an alkenyl aromatic resin and provided which include a minor amount of a organopolysiloxane having Si—H bonds. These compositions resist discoloration when they are processed in an extrusion and molding cycle.

BACKGROUND OF THE INVENTION

The term "polyphenylene ether resin" includes a family of polymers well known to those skilled in the art. They are made by a variety of catalytic and non-catalytic processes from the corresponding phenols or reactive derivatives thereof. By way of illustration, certain of the following polyphenylene ethers ae discussed in Hay, U.S. Pat. Nos. 3,306,874 and 3,306,875, and in Stamatoff, U.S. Pat. Nos. 3,257,357 and 3,257,358. Also, the Bennett and Cooper patents, U.S. Pat. Nos. 3,639,656, 3,642,699, 3,661,848 and 3,730,944 (Bennett and Katchman) describe processes for the preparation of polyphenylene ethers. In the Hay patents, the polyphenylene ethers are prepared by a oxidative coupling reaction comprising passing an oxygen-containing gas through a reaction solution of a phenol and a metal-amine complex catalyst. Other disclosures relating to processes using metal-amine catalysts are found in Bussink et al, U.S. Pat. No. 3,337,499; Blanchard et al, U.S. Pat. No. 3,219,626; Laakso et al, U.S. Pat. No. 3,342,892; Borman, U.S. Pat. No. 3,344,166; Hori et al., U.S. Pat. No. 3,384,619; Faurote et al., U.S. Pat. No. 3,440,217; and disclosures relating to metal based catalysts which do not include amines, are well known from patents such as Wieden et al, U.S. Pat. No. 3,442,885 (copper-amidines); Nakashio et al., U.S. Pat. No. 3,573,257 (metal-alcoholate or phenolate); Kobayashi et al., U.S. Pat. No. 3,455,880 (cobalt chelates); and the like. In the Stamatoff patents, the polyphenylene ethers are produced by reacting the corresponding phenolate ion with an initiator, such as a peroxy acid salt, an acid peroxide, a hypohalite, and the like, in the presence of a complexing agent. Disclosures relating to non-catalytic processes, such as oxidation with lead dioxide, silver oxide, etc., are described in Price et al., U.S. Pat. No. 3,382,212. All of the patents which are mentioned above are incorporated herein by reference.

The Cizek patent, U.S. Pat. No. 3,383,435 discloses compositions of polyphenylene ether resins and styrene resins. The thermoplastic compositions disclosed by Cizek may include a rubber-modified styrene resin, as well as crystal polystyrene. This patent is hereby incorporated by reference.

In the prior art certain compositions of polyphenylene ethers and polyorganosiloxanes have been described. For example, U.S. Pat. No. 3,737,479 discloses the use of certain types of organosiloxanes as impact modifiers for polyphenylene ether resin compositions. Also, U.S. Pat. No. 3,063,872 discloses certain types of organopolysiloxanes in combination with polyphenylene ethers. Those compositions are mentioned as having special utility in recording, storing and reproducing photographic images. All of the compositions disclosed in these prior art patents were limited to organosubstituted polysiloxanes and did not teach compositions of a polyphenylene ether with organopolysiloxanes having Si—H bonds.

Polyphenylene ether resin compositions that include alkenyl aromatic resins such as styrene resin, exhibit a propensity for discoloration when they are extruded and molded. This discoloration is manifested as a yellowish tinge that is particularly objectionable when white or pastel-colored products are being manufactured. Therefore, thermally stable polyphenylene ether-alkenyl aromatic resin blends are particularly useful.

It has now been found that the use of a minor amount of an organopolysiloxane, having Si—H bonds, as an additive to thermoplastic polyphenylene ether-alkenyl aromatic resin compositions will contribute to the thermal stability thereof.

Accordingly, it is a primary object of this invention to provide thermoplastic compositions which comprise a polyphenylene ether and an alkenyl aromatic resin, which do not exhibit thermal discoloration when they are processed through an extrusion and molding cycle.

It is also an object of this invention to provide thermoplastic compositions which comprise polyphenylene ethers and an alkenyl aromatic resin which exhibit improved thermal stability without substantially affecting the tensile strength, elongation, impact strength or heat distortion temperature.

DESCRIPTION OF THE INVENTION

The above-mentioned advantages and objects are attained by the following composition:
A. a polyphenylene ether resin;
B. an alkenyl aromatic resin; and
C. an organopolysiloxane of the formula $$(R')_a (H)_b SiO_{4-a-b/2} \quad (1)$$

wherein R' is an organic radical attached to silicon through silicon-carbon linkages, $a$ has a value of 1.0 to 2.5, inclusive; $b$ has a value of from 0.005 to 2.0, inclusive; and the sum of $a$ plus $b$ is equal to from 1.005 to 3.0, inclusive.

These materials may also be referred to as "organopolysiloxane hydrides".

The polyphenylene ether resins which may be employed in this invention include those of the formula:

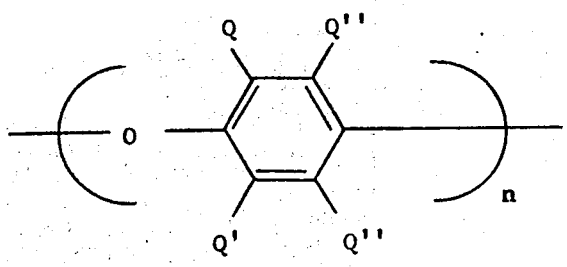

wherein Q is a hydrocarbon radical, a halohydrocarbon radical having at least two carbon atoms between the halogen atom and the phenol nucleus, a hydrocarbonoxy radical or a halohydrocarbonoxy radical having at least two carbon atoms between the halogen atom and the phenol nucleus; and Q' and Q'' are the same as Q and, in addition, halogen provided that Q, Q' and Q'' are all free of a tertiary alpha-carbon atom, and $n$ is at least 50. Preferred polyphenylene ethers are those wherein Q and Q' are hydrocarbon radicals having from 1 to 8 carbon atoms and Q'' are each hydrogen and especially preferred is poly-(2,6-dimethyl-1,4-phenylene) ether.

The organopolysiloxanes of Formula I include those compounds where the organic radicals represented by R' are radicals selected from the group consisting of (lower) alkyl of from 1 to 10 carbon atoms, cycloalkyl, aryl, aralkyl, (e.g., having 1 to 10 carbon atoms in the alkyl moiety)and the halogenated or cyano derivatives thereof such as halo (lower) alkyl, halocycloalkyl, haloaryl, haloaralkyl and cyanoalkyl. Examples of these groups include methyl, ethyl, propyl, butyl, octyl, cyclohexyl, cycloheptyl, phenyl, naphthyl, tolyl, xylyl, benzyl, phenylethyl, phenylpropyl, chloromethyl, chloropropyl, chlorophenyl, dibromophenyl, beta-cyanoethyl, gamma-cyanopropyl, beta-cyanopropyl and the like.

The organopolysiloxane hydrides that may be employed in the invention can also be characterizd as copolymers containing at least one unit per molecule having the formula:

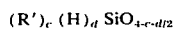  (II)

with the remaining siloxane units in the organopolysiloxane having the average formula:

  (III)

where R' is the same as hereinabove defined, $c$ has a value of from 0 to 2, inclusive; $d$ has a value of from 1 to 2, inclusive; and $P$ has a value of from 1 to 2.5, inclusive A preferred class of organosiloxanes are those of the formula:

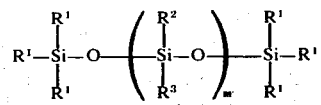  IV wherein
$R^1$ is (lower) alkyl of from 1–10 carbon atoms or (lower)alkenyl of from 1 to 10 carbon atoms, aryl, aralkyl, alkaryl, and halogenated and cyano derivatives of the aforesaid alkyl, alkenyl, aryl, aralkyl, alkaryl, groups
$R^2$ is hydrogen
$R^3$ is(lower) alkyl of from 1–10 carbon atoms or phenyl, and $m$ is an integer from 10–1000.

When $R^1$ and $R^3$ are alkyl of from 1 to 10 carbon atoms, $R^1$ or $R^3$ may be methyl, ethyl, propyl, n-hexyl, cyclohexyl, etc.; (lower) alkenyl will include allyl, 2-butenyl, 2-hexenyl etc.; haloalkyl groups will include chloromethyl, 2-bromoethyl etc.; aryl groups will include phenyl and naphthyl; aralkyl groups will include benzyl and phenethyl; alkaryl groups will include tolyl, xylyl; the bromo or chloro derivatives of these substituents may also be employed.

An especially preferred class of compounds are:

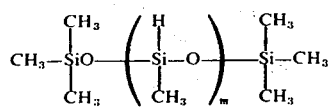

where $m$ has a value of 10–50, preferably 20–30.

The organopolysiloxanes useful in this invention are well known and many are commercially available. They are described in U.S. Pat. Nos. 2,588,365; 2,588,366; 2,588,367; 3,516,946, which are all incorporated by reference.

The particular alkenyl aromatic resin is not critical to the practice of the invention. Preferred materials include those having at least 25%, by weight, polymer units that are derived from a monomer having the formula:

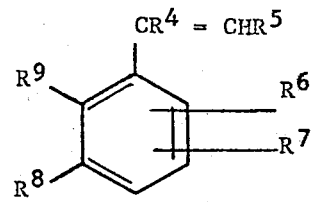

wherein $R^4$ and $R^5$ are selected from the group consisting of lower alkyl or alkenyl groups of from 1 to 6 carbon atoms and hydrogen; $R^6$ and $R^7$ are selected from the group consisting of chloro, bromo, hydrogen and lower alkyl of from 1 to 6 carbon atoms; $R^8$ and $R^9$ are selected from the group consisting of hydrogen and lower alkyl and alkenyl groups of from 1 to 6 carbons or $R^8$ and $R^9$ may be concatenated together with hydrocarbyl groups to form a naphthyl group. By way of example, homopolymers such as polystyrene; the modified polystyrenes such as the rubber-modified, high-impact polystyrene; styreneacrylonitrile copolymers; styrene-acrylonitirle - $\alpha$ - alkylstyrene copolymers; poly- $\alpha$ - methylstyrene; copolymers of ethylvinylbenzene and divinylbenzene, vinylnaphthalene and the like.

The alkenyl aromatic resin may be modified with natural and synthetic rubbers, such as polybutadiene, polyisoprene, rubbery copolymers of dienes with other comonomers, such as styrene, acryonitrile, acrylic esters, and the like, including block copolymers of the A—B—A and A-B type wherein A is a vinyl aromatic compound such as styrene, and B is a diene such as butadiene as well as EPDM rubbers and the like. The preferred alkenyl aromatic resin is rubber-modified, high-impact polystyrene which has been modified with butadiene rubber.

The proportions of the components of the composition may vary, although it is preferred to employ from about 20–80 parts by weight of the polyphenylene ether resin component and from 80–20 parts by weight of the alkenyl aromatic resin and from 0.25–2 parts by weight of an organopolysiloxane as described hereinabove.

The compositions of the invention may also include reinforcing fillers, such as aluminum, iron or nickel, and the like; and non-metals, such as carbon filaments, silicates, such as acicular calcium silicate, asbestos, titanium dioxide, potassium titanate and titanate whiskers, glass flakes and fibers, It is also to be understood that, unless the filler adds to the strength and stiffness of the composition, it is only a filler and not a reinforcing filler, as contemplated herein. In particular, the reinforcing fillers increase the flexural strength, the flexural modulus, the tensile strength and the heat distortion temperature.

Although it is only necessary to have at least a reinforcing amount of the reinforcement present, in general, the combination of components (a) and (b) will comprise from about 10 to about 90 parts by weight and the filler will comprise from about 10 to about 90 parts by weight of the total composition.

In particular, the preferred reinforcing fillers are of glass and it is preferred to use fibrous glass filaments comprised of lime-aluminum borosilicate glass that is relatively soda free. This is known as "E" glass. However, other glasses are useful where electrical properties are not so important, e.g., the low soda glass known as "E" glass. The filaments are made by standard processes, e.g., by steam or air blowing, flame blowing and mechanical pulling. The preferred filaments for plastics reinforcement are made by mechanical pulling. The filament diameters range from about 0.000112 to 0.00075 inch, but this is not critical to the present invention.

In general, best properties will be obtained if the sized filamentous glass reinforcement comprises from about 1 to about 80% by weight based on the combined weight of glass and polymers and preferably from about 10 to about 50% by weight. Especially preferably the glass will comprise from about 10 to about 40 % by weight based on the combined weight of glass and resin. Generally, for direct molding use, up to about 60% of glass can be present without causing flow problems. However, it is useful also to prepare the compositions containing substantially greater quantities, e.g., up to 70–80% by weight of glass. These concentrates can then be custom blended with blends of resins that are not glass reinforced to provide any desired glass content of a lower value.

The length of the glass filaments and whether or not they are bundled into fibers and the fibers bundled in turn to yarns, ropes or rovings, or woven into mats, and the like, are also not critical to the invention. However, in preparing the present compositions, it is convenient to use the filamentous glass in the form of chopped strands of from about ⅛ inch to about 1 inch long, preferably less than ¼ inch long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.000005 inch and 0.125 (⅛ inch).

It is a preferred feature of this invention also to provide flame retardant thermoplastic compositions, as defined above by modifying the composition to include a flame-retardant additive in a minor proportion but in an amount at least sufficient to render the composition non-burning or self-extinguishing.

Particular flame retardants which may be used are well known and are described in the literature.

The compositions may be prepared by tumbling the components, extruding the mixed powders into a continuous strand, chopping the strands into pellets and thereafter molding the pellets into the desired shape. These techniques are well known to those skilled in this art and are not a critical feature of the invention.

DESCRIPTION OF THE PREFERRED EMBODIMENTS

The following examples illustrate the processes of this invention. They are merely illustrative and are not to be construed as limitations on the present invention.

Example 1

A blend of 150 g of rubber-modified, high-impact polystyrene*, 150 g of poly-(2,6-dimethyl-1,4-phenylene) ether (color No. 3.1, I.V. = 0.49 dl/g), 9.0 g of triphenyl phosphate, 3.0 g of tridecyl phosphite, 4.5 g polyethylene (Microthene 710), 0.45 g of zinc sulfide and 0.45 g of zinc oxide was extruded on a WP 28 mm twin-screw extruder. A second blend identical with the first except for the addition of 1.5 g of a silicone oil** of the formula

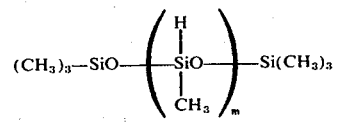

when m has a value between 20 and 30, was prepared and extruded in the same way.

*Foster Grant 834.
**DF 1040 oil.

Two blends of the same composition (with and without the silicone oil) were prepared using a different poly(2,6-dimethyl-1,4-phenylene) ether (Color No. 5.5, I.V. = 0.48 dl/g). The yellowness index of the extruded pellets from the four blends was measured using a Kollmorgen Color Eye. Color chips were molded using a 3 oz. Newbury injection molding machine.

In each case the color of the extruded pellets and molded chips was much lower when the silicone oil was present (Table 1).

TABLE 1

| Polyphenylene Ether Color No. | Silicone Oil | Yellowness Index Pellets | Molded Chip |
|---|---|---|---|
| 3.1 | 0 | 51.5 | 48.4 |
| 3.1 | 1% by wt. (based on polyphenylene ether) | 40.3 | 39.1 |
| 5.5 | 0 | 65.0 | 62.4 |
| 5.5 | 1% by wt. (based on polyphenylene ether) | 55.8 | 54.7 |

EXAMPLE 2

Blends were prepared, extruded and molded as in Example 1, using the same materials and proportions of zinc sulfide, zinc oxide and polyethylene in each case as in Example 1, but varying amounts of poly-(2,6-dimethyl-1,4-phenylene) ether, the modified polystyrene, TDP, TPP, and silicone oil. Each blend also contained 5% of titanium dioxide. The effect of these variations on the yellowness index of molded chips is shown in Table 2. The reduction in color produced by 0.5% of silicone oil is approximately equal to that produced by 1.0% of TDP, but the lightest colors were obtained by using TDP and silicone oil together.

TABLE 2*

| poly-(2,6-dimethyl-1,4-phenylene)ether | rubber modified high impact polystyrene | TPP | TDP | Silicone Oil | Y.I. |
|---|---|---|---|---|---|
| 50 | 50 | 3 | 1 | 0 | 17.9 |
| 50 | 50 | 3 | 1 | 0.5 | 12.0 |
| 50 | 50 | 3 | 0 | 0 | 22.3 |
| 50 | 50 | 3 | 0 | 0.5 | 18.1 |
| 35 | 65 | 7 | 0.5 | 0 | 15.6 |
| 35 | 65 | 7 | 0.5 | 0.35 | 12.7 |
| 35 | 65 | 7 | 0 | 0 | 19.1 |
| 35 | 65 | 7 | 0 | 0.35 | 15.6 |

*The amounts of materials are given in parts per hundred, based on the total amount of composition.

Obviously, other modifications and variations of the present invention are possible, in the light of the above teachings. It is, therefore, to be understood that changes may be made in the particular embodiments of the invention described which are within the full intended scope of the invention as defined by the appended claims.

I claim:

1. A thermoplastic molding composition which comprises:
   A. from 20 to 80 parts by weight of a polyphenylene ether resin;
   B. from 80 to 20 parts by weight of an alkenyl aromatic resin; and
   C. from 0.25 to 2 parts by weight of an organopolysiloxane of the formula

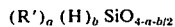

wherein R' is an organic radical attached to silicon through silicon-carbon linkages, a has a value of 1.0 to 2.5, inclusive; b has a value of from 0.005 to 2.0, inclusive; and the sum of a plus b is equal to from 1.005 to 3.0, inclusive.

2. A composition as defined in claim 1 wherein said polyphenylene ether is of the formula:

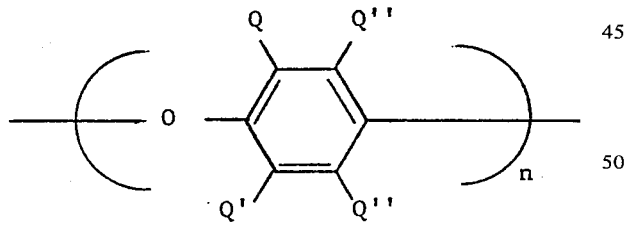

wherein Q is a hydrocarbon radical, a halohydrocarbon radical having at least two carbon atoms between the halogen atom and the phenol nucleus, a hydrocarbonoxy radical or a halohydrocarbonoxy radical having at least two carbon atoms between the halogen atom and the phenol nucleus; and Q' and Q'' are the same as Q and, in addition halogen, provided that Q, Q' and Q'' are all free of a tertiary alpha-carbon atom, and n is at least 50.

3. A composition as defined in claim 2 wherein Q and Q' are hydrocarbon radicals having from 1 to 8 carbon atoms and Q'' are each hydrogen.

4. A composition as defined in claim 1 wherein the organopolysiloxane has the formula

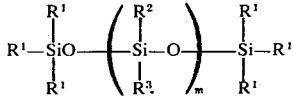

wherein
R¹ is selected from the group consisting of (lower) alkyl of from 1–10 carbon atoms, (lower)alkenyl of from 1–10 carbon atoms, aryl, aralkyl, alkaryl, and halogenated and cyano derivatives of said groups;
R² is hydrogen
R³ is (lower) alkyl of from 1–10 carbon atoms or phenyl and m is an integer of from 10–1000.

5. A composition as defined in claim 1 wherein the organopolysiloxane has the structure:

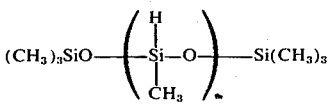

wherein m has a value of 10–50.

6. A composition as defined in claim 5 wherein m has a value of 20–30.

7. A composition as defined in claim 1 wherein from 0.25 to 2% by weight of the polymeric siloxane is present in the composition.

8. A method of preventing thermally induced discoloration of thermoplastic polyphenylene ether resin-alkenyl aromatic resin compositions which contain respectively from 20–80 parts by weight of the polyphenylene ether resin and from 20–80 parts by weight of the alkenyl aromatic resin, said method comprising adding to said thermoplastic compositions a discoloration preventing amount of an organopolysiloxane of the formula

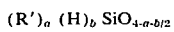

wherein R' is an organic radical attached to silicon through silicon-carbon linkages, a has a value of from 1.0 to 2.5, inclusive; b has a value of from 0.005 to 2.0, inclusive; and the sum of a plus b is equal to from 1.005 to 3.0, inclusive.

9. A method as defined in claim 8 wherein said polyphenylene ether is of the formula:

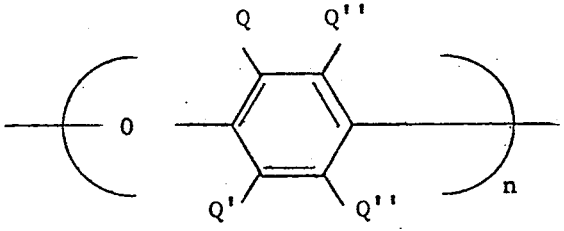

wherein Q is a hydrocarbon radical, a halohydrocarbon radical having at least two carbon atoms between the halogen atom and the phenol nucleus, a hydrocarbonoxy radical or a halohydrocarbonoxy radical having at least two carbon atoms between the halogen atom and the phenol nucleus; and Q' and Q'' are the same as Q and, in addition halogen, provided that Q, Q' and Q'' are all free of a tertiary alpha-carbon atom, and $n$ is at least 50.

10. A method as defined in claim 9 wherein Q and Q' are hydrocarbon radicals having from 1 to 8 carbon atoms and Q''are each hydrogen.

11. A method as defined in claim 10 wherein Q and Q' are each methyl radicals.

12. A method as defined in claim 8 wherein the organopolysiloxane has the structure:

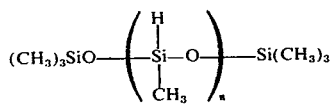

wherein $m$ has a value of 10–50.

13. A method as defined in claim 12 wherein $m$ has a value of 20–30.

14. A method as defined in claim 8 wherein from 0.25 to 2% by weight of the organopolysiloxane is present in the composition.

15. A thermoplastic composition which consists essentially of:
  a. from 20 to 80 parts by weight of a polyphenylene ether;
  b. from 80 to 20 parts by weight of an alkenyl aromatic resin having at least 25% by weight of its units derived from a monomer of the formula:

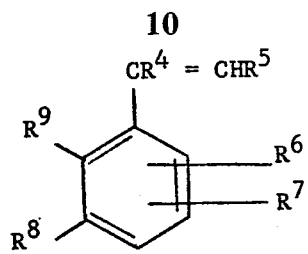

wherein $R^4$ and $R^5$ are selected from the group consisting of lower alkyl or alkenyl groups of from 1 to 6 carbon atoms and hydrogen; $R^6$ and $R^7$ are selected from the group consisting of chloro, bromo, hydrogen and lower alkyl of from 1 to 6 carbon atoms; $R^8$ and $R^9$ are selected from the group consisting of hydrogen and lower alkyl and alkenyl groups of from 1 to 6 carbon atoms or $R^8$ and $R^9$ may be concatenated together with hydrocarbyl groups to from a naphthyl group; and
  c. from 0.25 to 2 parts by weight of an organopolysiloxane of the formula:

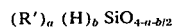

wherein R' is an organic radical attached to silicon through silicon-carbon linkages, $a$ has a value of 1.0 to 2.5, inclusive; $b$ has a value of from 0.005 to 2.0, inclusive; and the sum of $a$ plus $b$ is equal to from 1.005 to 3.0, inclusive.

16. A composition as defined in claim 15 wherein the alkenyl aromatic resin is rubber modified, high impact polystyrene.

* * * * *

UNITED STATES PATENT AND TRADEMARK OFFICE
CERTIFICATE OF CORRECTION

PATENT NO. : 3,960,985
DATED : June 1, 1976
INVENTOR(S) : Glenn D. Cooper

It is certified that error appears in the above-identified patent and that said Letters Patent are hereby corrected as shown below:

In the Title, "ORGANOPOLYILOXANES" should be -- ORGANOPOLYSILOXANES --.

Column 1, line 2, "ORGANOPOLYILOXANES" should be -- ORGANOPOLYSILOXANES --.

Column 1, line 6, after the word "resin" (second occurrence) delete the word "and" and insert -- are --.

Column 5, line 14, change "E" to -- "C" --.

Signed and Sealed this

Twenty-first Day of September 1976

[SEAL]

Attest:

RUTH C. MASON
Attesting Officer

C. MARSHALL DANN
Commissioner of Patents and Trademarks